US006844544B2

(12) United States Patent
Cornish et al.

(10) Patent No.: US 6,844,544 B2
(45) Date of Patent: Jan. 18, 2005

(54) MASS SPECTROMETER FOR SIMULTANEOUS DETECTION OF REFLECTED AND DIRECT IONS

(75) Inventors: Timothy J. Cornish, Catonsville, MD (US); Scott A. Ecelberger, Laurel, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 10/480,243

(22) PCT Filed: Sep. 20, 2002

(86) PCT No.: PCT/US02/29982

§ 371 (c)(1), (2), (4) Date: Dec. 9, 2003

(87) PCT Pub. No.: WO03/024572

PCT Pub. Date: Mar. 27, 2003

(65) Prior Publication Data

US 2004/0206900 A1 Oct. 21, 2004

Related U.S. Application Data

(60) Provisional application No. 60/323,563, filed on Sep. 20, 2001.

(51) Int. Cl.[7] .......................... H01J 49/00; H01J 49/40; B01D 59/44

(52) U.S. Cl. ....................... 250/287; 250/281; 250/282; 250/286

(58) Field of Search ................................ 250/287, 281, 250/282, 286

(56) References Cited

U.S. PATENT DOCUMENTS

| | | | | |
|---|---|---|---|---|
| 5,160,840 A | | 11/1992 | Vestal | |
| 5,464,985 A | | 11/1995 | Cornish et al. | |
| 5,981,946 A | | 11/1999 | Mason | |
| 6,013,913 A | | 1/2000 | Hanson | |
| 6,534,764 B1 | * | 3/2003 | Verentchikov et al. | 250/287 |
| 6,545,268 B1 | * | 4/2003 | Verentchikov et al. | 250/287 |

OTHER PUBLICATIONS

Patent Cooperation Treaty International Search Report for PCT/US02/29982 mailed Feb. 26, 2002.

* cited by examiner

*Primary Examiner*—John R. Lee
*Assistant Examiner*—Kalimah Fernandez
(74) *Attorney, Agent, or Firm*—Albert J. Fasulo

(57) ABSTRACT

Techniques for simultaneously detecting direct and reflected ions in a time-of-flight tube (120) and a source (110) for generating an ion beam of ions of a sample and introducing the ion beam into a first portion of the flight tube. A reflector (126) reflects ions from the ion beam in a second portion of the flight tube. A plate (140) substantially perpendicular to an axis of the ion beam is located between the first portion of the flight tube and the second portion of the flight tube. The plate has a hole through which some ions in the ion beam may pass from the first portion to the second portion of the flight tube. Each of two opposite faces of the plate includes a set of one or more ion detectors (140). The technique allows rapid, reliable detection of complex agents in a small number of samples.

14 Claims, 4 Drawing Sheets

MASS SPECTROMETER FOR SIMULTANEOUS DETECTION OF REFLECTED AND DIRECT IONS

CROSS-REFERENCE TO RELATED APPLICATIONS

This application claims benefit of Provisional Application 60/323,563 filed Sep. 20, 2001, the entire contents of which are hereby incorporated by reference as if fully set forth herein, under 35 U.S.C. §119(e).

BACKGROUND OF THE INVENTION

1. Field of the Invention

The present invention relates to mass spectrometry of samples with complex molecules, and more particularly to mass spectrometry that simultaneously detects direct ("linear") and reflected time-of-flight mass spectra.

2. Description of the Related Art

The past approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

Populated locations are susceptible to natural and artificial infestations of biological agents that are harmful to human health. Early detection of such infestations allows rapid evacuation of such locations and provides one line of defense. Rapid treatment of exposed individuals provides a second line of defense. Correct treatment often depends on rapid, correct identification of the harmful agent.

One method commonly used to detect and identify biological agents is mass spectrometry, in which a distinctive distribution of molecular weights is associated with each of several biological agents of interest in protecting public health.

In mass spectrometry, a sample of material is ionized, which changes molecules in the sample to ions (molecules with a net electrical charge). For example, a laser can be used to remove electrons from the molecules, leaving positive ions. The ions are accelerated in a source region using an electric field. For a given electrical voltage used to accelerate the ions, the less massive ions are accelerated to faster speeds than are the more massive ions. Outside the source region, in a region called a "drift region," each ion travels at a characteristic speed inversely related to its mass. Therefore, the times of flight for the ions to travel from the source region to a detector are related to the masses of the ions. To reduce collisions with air molecules, the source region and drift region are in a vacuum that can be readily produced in a vacuum chamber or that is ambient outside the earth's atmosphere.

Because some of the molecules of interest are rather large, a difference of a few atomic mass units between two molecules, related to a difference in chemical and biological properties, is associated with a relatively small difference in mass and therefore a relatively small difference in speed. To distinguish two molecules that are close in mass and speed, a rather long path for the ions is desirable to increase the difference in time of flight.

Problems arise when the path length is increased. For example, paths of the ions tend to diverge in the drift region; and, thus, more ions miss the detector, decreasing the signal at the detector. To reduce divergence, the ions are focused into an ion beam during the acceleration stage. Focusing the ions into an ion beam reduces the number of ions that miss the detector.

Furthermore, increasing the path length involves increasing the length of the drift region, which increases the size of the mass spectrometer. A larger mass spectrometer is a disadvantage and can cause the mass spectrometer to be too large for some applications. For example, a mass spectrometer that is too large may be unsuitable for a portable unit, or unsuitable for deployment in aircraft, air ducts, and other useful places. The problems are exacerbated if the ion detector is also made larger to compensate for the greater divergence over the longer paths.

In another approach, the path length is essentially doubled without appreciably increasing the size of the mass spectrometer by reflecting the ion beam in a reflecting electric field. The reflecting electric field is tuned to the accelerating field in the source region so that the ions reverse direction after traversing the length of the reflecting region and before striking the end wall of the spectrometer. In conventional reflected time-of-flight mass spectrometers, a directional detector is placed close to the source but facing away from the source. A hole in the detector allows most of the ions in the ion beam from the source to pass through the detector into a reflection portion of the spectrometer. When the ions in the beam are reflected to move back toward the source, many of the ions strike the detector.

A problem with the reflected time-of-flight mass spectrometer is that some very large molecules are too fragile to be decelerated to zero and accelerated into the reverse direction without breaking apart into two or more fragments. For example, molecules with masses of about 10,000 atomic mass units (amu) or higher tend to fragment in a reflected time-of-flight mass spectrometer (an atomic mass unit is about the mass of a proton). One or more of the fragments may be uncharged. An uncharged fragment most likely strikes a wall of the mass spectrometer without ever impinging on the detector and might not be detected even if it does strike the detector. The mass of the fragment becomes lost to the detector. Lighter fragments that retain a charge will be reversed too quickly and strike the detector after a time of flight associated with lower mass molecules.

Another problem with a reflected time-of-flight mass spectrometer is that an incentive to make the detector hole large enough to pass most of the ion beam conflicts with a motivation to make the detector hole as small as possible to detect most of the reflected ions. As a result, the hole is often so small that a significant number of ions are lost that strike the back of the detector and never enter the reflection region. This decreases the signal at the detector.

To be useful as a line of defense in populated areas, the mass spectrometer should detect harmful biological agents with few, small samples that can be filtered from the air or water serving the populated areas. False alarms, caused by detections based on noisy data, should be avoided. A system that repeatedly fires a warning when no danger is actually present is more likely to be ignored when a real threat is detected. To reduce false alarms multiple measurements should be made that verify the existence of the mass distributions upon which detection is based. Well known statistical tests can be performed to generate confidence limits on the detections. Statistical confidence is achieved only after several samples are independently measured.

A problem with conventional mass spectrometer is that so much time is consumed in making several independent measurements that many more people are exposed to the agent before an alarm can be fired. This diminishes the conventional mass spectrometer's effectiveness on one line of defense. For example, to prepare one sample or set of samples for introduction to the mass spectrometer, to introduce the set of samples, to evacuate the air from the vacuum chamber and to remove the spent set of samples can take several minutes. To obtain measurements from even two sets of samples doubles that time and increases the exposure of the population to the biological agent.

Furthermore, it can be difficult to obtain enough independent measurements when sample amount is scarce. It may be difficult to obtain a sample of the biological agent, so that any sample obtained is precious. There may not be sufficient sample to make two independent measurements.

In one approach that may be pursued, a second detector may be placed in the vacuum chamber of a reflected time-of-flight mass spectrometer on a side farthest from the source. Then, before or after a reflected time-of-flight measurement, the reflecting electric field can be turned off, and a direct time-of-flight measurement can be made. However, this approach still loses signal from ions that miss the hole through the plate for the reflected ion detections, and consumes more sample and more time than are used during the reflected time-of-flight measurement alone.

Based on the foregoing there is a clear need for a portable mass spectrometer that can make reliable detections of biological agents, having reduced false-alarm rate, with few samples of small size in a short time. In particular, there is a need for a mass spectrometer that can simultaneously measure direct and reflected time-of-flight mass distributions.

SUMMARY OF THE INVENTION

According to one aspect of the invention, an apparatus for simultaneously detecting direct and reflected ions in a mass spectrometer includes a flight tube, and a source for generating a beam of ions from a sample. The ion source introduces the ion beam into a first portion of the flight tube. The apparatus includes a reflector for reflecting ions from the ion beam in a second portion of the flight tube. The apparatus also includes a mounting plate substantially perpendicular to an axis of the ion beam. The plate is installed between the first portion of the flight tube and the second portion of the flight tube. The mounting plate has a hole through which some ions in the ion beam may pass from the first portion to the second portion of the flight tube. Each of two opposite faces of the mounting plate includes a set of one or more ion detectors.

According to another aspect of the invention, a method of fabricating an apparatus for simultaneously detecting direct and reflected ions in a mass spectrometer includes installing, onto a flight tube, a source for generating an ion beam of ions of a sample. The source introduces the ion beam into a first portion of the flight tube. A reflector is also installed in the flight tube. The reflector reflects ions from the ion beam in a second portion of the flight tube. A mounting plate is installed in the flight tube substantially perpendicular to an axis of the ion beam between the first portion of the flight tube and the second portion of the flight tube. The mounting plate has a hole through which some ions in the ion beam may pass from the first portion to the second portion of the flight tube. Each of two opposite faces of the mounting plate includes a set of one or more ion detectors.

In another aspect of the invention, a method for simultaneously detecting direct and reflected ions in a mass spectrometer includes forming an ion beam from a sample in a source of ions. A first signal indicating a number of first ions from the ion beam is generated. The first ions strike a first face of a plate directed toward the source of ions. A second signal indicating a number of second ions from the same ion beam is also generated. The second ions strike a second face of the plate. The second face is directed away from the source of ions and directed toward the second ions that pass through a hole in the plate and that are reflected in a reflecting electric field. A direct time-of-flight mass distribution is determined based on the first signal; and a reflected time-of-flight mass distribution is determined based on the second signal. The reflected time-of-flight mass distribution is independent of the direct time-of-flight mass distribution since different ions are actually detected.

In another aspect of the invention, techniques for determining whether a particular agent is present in a sample include receiving a first signal. The first signal indicates a number of first ions from an ion beam generated from the sample in a source. The first ions strike a first face of a plate; the first face is directed toward the source of ions. A second signal indicating a number of second ions from the same ion beam is also received. The second ions strike a second face of the plate; the second face is directed away from the source of ions and directed toward the second ions that pass through a hole in the plate and that are reflected in a reflecting electric field. A direct time-of-flight mass distribution is determined based on the first signal. A reflected time-of-flight mass distribution is determined based on the second signal. It is determined whether the particular agent is present in the sample based, at least in part, on the direct time-of-flight mass distribution and the reflected time-of-flight mass distribution.

The plate with ion detectors on both opposite faces allows direct time-of-flight measurements on the face directed toward the source and reflected time-of-flight measurements on the face directed away from the source, from different ions in the same ion beam from the same source. By simultaneously obtaining a measurement of the direct time-of-flight mass distribution that is independent of a measurement of the reflected time-of-flight mass distribution, two independent measurements are made of the same small sample. This decreases the false alarm rate over conventional mass spectrometers when samples are in limited supply. In addition, total signal is increased, because ions that strike the plate outside the hole to the second portion, which are lost to the reflected measurement, are detected in the direct time-of-flight measurement. In addition, because the measurements are simultaneous (obtained without repeating the sample preparation, ionization, and acceleration, detection, and removal of the sample), the independent measurements needed are obtained in less time than in other approaches. Furthermore, measurements of the direct time-of-flight preserve detections of mass distributions from the larger molecules that fragment in reflected time-of-flight configurations.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for simultaneously detecting direct and reflected ions in a mass spectrometer is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1. Structural and Functional Overview

Figure 1A:
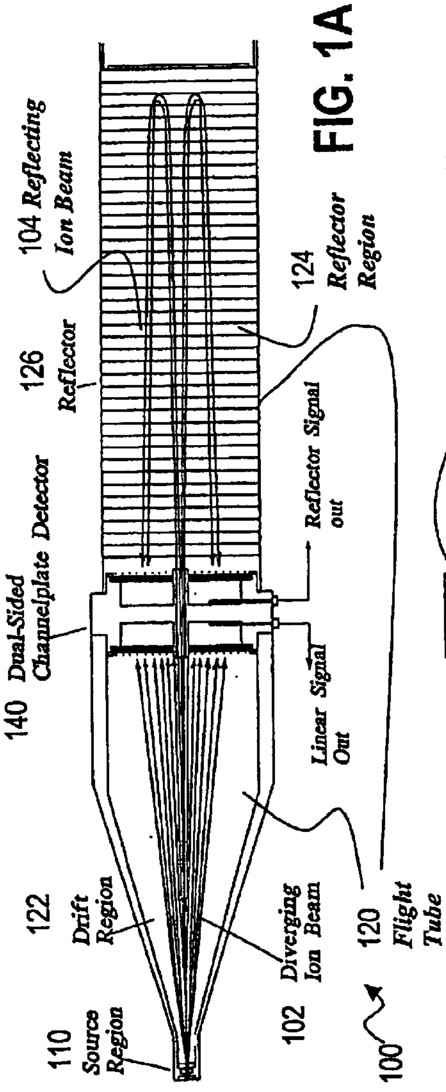
FIG. 1A is a block diagram that illustrates a mass spectrometer that simultaneously measures direct and reflected time-of-flight mass distributions according to an embodiment.

FIG. 1A is a block diagram that illustrates a mass spectrometer 100 that simultaneously measures direct and reflected time-of-flight mass distributions according to an embodiment. A mass spectrometer includes a flight tube120, which is housed in a vacuum chamber. In embodiments used outside Earth's atmosphere, the vacuum chamber may be omitted. The flight tube includes a source region portion 110, a drift region portion 122, and a reflector region portion 124. A reflector 126 in the reflector region portion 124 causes ions in an ion beam to reverse direction to double the path length and the time of flight in the reflector region portion 124 of the flight tube 120.

Between the drift region portion 122 and the reflector region portion 124 is a dual-sided channelplate detector 140 that separates the two portions. In some embodiments, the detector 140 is located between the two portions but does not separate the two portions. The dual-sided channelplate detector has microchannel plate ion detectors on each of two sides, or "faces" of the detector. One face is directed toward the source region portion 110 and the drift region portion 122; the opposite face is directed toward the reflection region portion 124. The dual-sided channelplate detector 140 is described in more detail below with reference to FIG. 1B. In other embodiments, another detector with ion detectors on two opposite faces is used.

A sample in the source region portion 110 is ionized, and the ions are accelerated and focused into an ion beam. In some embodiments, the sample is ionized by shining a laser on the sample in the source region portion 110. In the drift region portion 122, the ion beam 102 diverges. Some ions in the diverging ion beam 102 strike the face of the detector 140 directed toward the source region portion 110 and the drift region portion 122. These ions are detected in the microchannel plate detectors on that face of the detector 140 and are used to determine a direct ("linear") time-of-flight mass distribution.

Some ions in the diverging ion beam 102 pass through a hole in the detector 140 into the reflector region portion 124. An electric field established by reflector 126 reverses the direction of travel of these ions to form a reflecting ion beam 104. Ions from the reflecting ion beam 104 strike the face of the detector 140 directed toward the reflector region portion 124. These ions are detected in the microchannel plate detectors on this face of the detector 140, and are used to determine a reflected time-of-flight mass distribution.

The linear and reflected mass distributions provide independent observations of the mass distribution obtained from the sample in source region portion 110. Different individuals of essentially the same types of ions contribute to the measurements obtained at each plate. A sample component whose characteristic mass peaks are found in both distributions is more likely to be actually present in the sample then to be a false alarm caused by noise or instrument error. Even a small, precious sample ionized in source region portion 110 yields at least two independent measurements of mass distributions.

Although the illustrated embodiment employs microchannel plate detectors on each face of detector 140, in other embodiments other ion detectors are employed. Any center-hole ion detector known in the art at the time the mass spectrometer is constructed may be used.

In the illustrated embodiment, the vertical lines in the reflector region portion 124 represent conductors that are part of reflector 126 in a wall of the reflector region portion 124 of flight tube 120. These conductors are each set at a different voltage to form a voltage gradient in the reflector region. In other embodiments, other reflectors may be used. Any reflector known in the art at the time the mass spectrometer is constructed may be used.

2. Dual-Sided Channelplate Detector

Figure 1B:
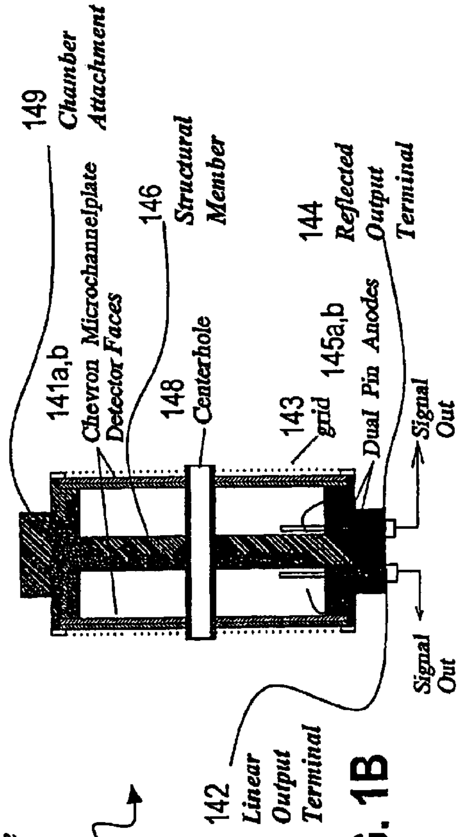
FIG. 1B is a block diagram that illustrates a mounting plate with ion detectors on both faces, according to an embodiment.

FIG. 1B is a block diagram that illustrates a detector 140 made up of a mounting plate with ion detectors on both faces, according to an embodiment.

The detector 140 includes a plate shaped structural member 146 configured for attachment to the flight tube 120. In the illustrated embodiment, the structural member 146 includes an attachment element 149 configured to attach to a drift region portion 122 of the flight tube 120 and to attach to the reflector region portion 124 of the flight tube. In other embodiments, the structural member is attached to a mount inside the flight tube 120 in any manner known at the time the mass spectrometer is constructed. In one embodiment, the structural member 146 is disc shaped in the plane perpendicular to the drawing of FIG. 1B; in other embodiments, the structural member has other shapes, such as a rectangular shape. In some embodiments, the structural member 146 fills a space between the drift region portion 122 and the reflector region portion 124 of the flight tube 120, when assembled; in other embodiments, the structural member 146 does not fill that space.

The structural member 146 includes a center hole 148 that allows some ions of the diverging ion beam 102 to pass into the reflector region portion 124. In the illustrated embodiment, the hole 148 is substantially centered in the structural member; in some other embodiments the hole may be located at any position on the structural member. In some embodiments in which the structural member does not fill the space between the drift region portion 122 and the reflector region portion 124, ions can pass into the reflector region portion 124 outside the structural member 146 and the "hole" is considered part of the plate outside the structural member 146. A hole disposed close to the center of the detector 140 is preferred because more diverging ions and reflected ions strike the detector and provide additional signal when the hole that passes ions into the reflector region portion 124 is close to the center of the detector and aligned with a center of a focused ion beam.

The detector 140 includes two faces 141*a*, 141*b* with one or more ion detectors on each face. In the illustrated embodiment, each face includes a microchannel detectors.

(A grid 143 is a fine metallic mesh used to precisely define the boundaries between different electric fields. The two faces 141*a*, 141*b* are termed chevron microchannelplate detector faces (or dual-sided channelplate detector faces). In other embodiments, other ion detectors are employed on each face 141*a*, 141*b*. One face 141*a* is directed toward the source region portion 110 and the drift region portion 122 of flight tube 120. The opposite face 141*b* is directed toward the reflector region portion 124 of flight tube 120. In the illustrated embodiment, a gap is formed between the faces 141*a*, 141*b* and portions of the structural member 146. In other embodiments the opposite faces with detectors are flush with the structural member 146. In the illustrated embodiment, the faces 141*a*, 141*b* do not extend outside the perimeter of the structural member in the plane perpendicular to the drawing of FIG. 1B; in other embodiments, the opposite faces with detectors may extend outside that perimeter. In other embodiments, grid 143 is eliminated from the detector mount altogether.

The detector 140 includes an anode to collect electrons emitted from the rear of the channelplates. In the illustrated embodiment dual pin anodes 145*a*, 145*b* are employed. In other embodiments, other anodes may be used, such as annular shaped anodes concentric with the faces 141*a*, 141*b*. Ions (positive or negative ions depending on the analyzer configuration) from an ion beam strike the surface of each detector from which secondary electrons are subsequently ejected. This electron signal is amplified as the electrons cascade along the inner surfaces of micro-channels within the detector. A large number of electrons emerge from the rear of the detector for each ion that strikes the front surface of the detector, resulting in a large gain in electrical current. For example, a gain of approximately $10^6$ can be achieved.

The detector 140 includes two output terminals, each for providing a signal related to the number of ions. For example, the currents at the anodes 145*a*, 145*b* are converted to voltage signals. These voltage signals at the two terminals are related to the number of ions that strike the two opposite faces. A linear output terminal 142 carries a signal related to the number of ions that strike face 141*a* directed toward the source region portion 110 and drift region portion 122. A reflected output terminal 144 carries a signal related to the number of ions that strike face 141*b* directed toward the reflector region portion 124.

3. Example Data from Dual-Sided Channelplate Detector

Figures 2A, 2B:
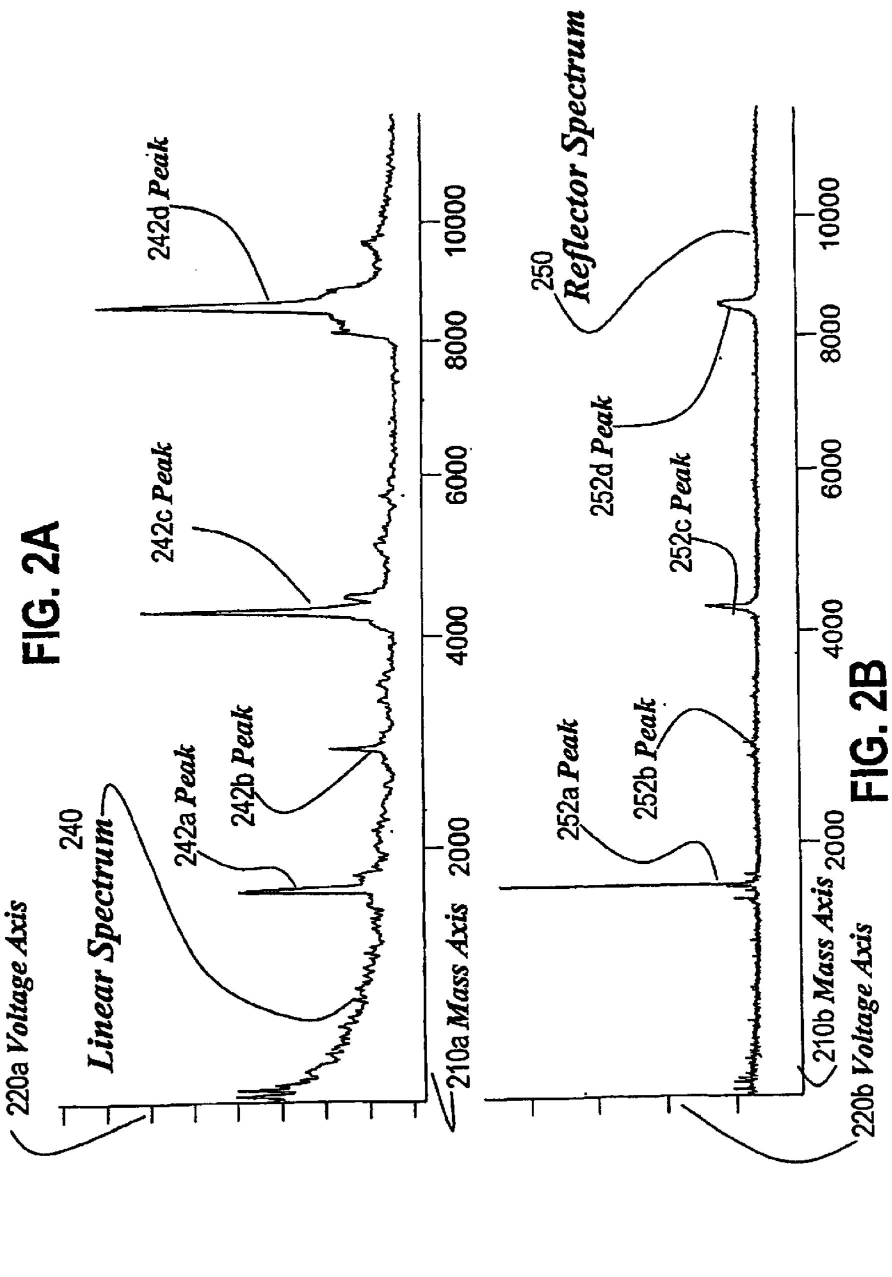
FIG. 2A is a graph of an example mass distribution for direct ("linear") time-of-flight, according to an embodiment.
FIG. 2B is a graph of an example mass distribution for reflected time-of-flight, according to an embodiment.

FIG. 2A is a graph of an example linear spectrum 240 that shows a mass distribution for direct ("linear") time-of-flight, according to an embodiment. FIG. 2A is based on time-of-flight measurements for ions detected on face 141*a* of the detector 140 depicted in FIG. 1B. FIG. 2B is a graph of an example reflector spectrum 250 that shows a mass distribution for reflected time-of-flight, according to an embodiment. FIG. 2B is based on time-of-flight measurements for ions detected on face 141*b* of the detector 140 depicted in FIG. 1B.

The graphs of FIG. 2A, FIG. 2B plot voltage amplitude on voltage axes 220*a*, 220*b* against mass on mass axes 210*a*, 210*b*, respectively. Voltage amplitude is provided by the signal on the linear output terminal 142 and the reflected output terminal 144, respectively, and is related to the number of ions striking the microchannel plate detectors on faces 141*a*, 141*b*, respectively. Mass, measured in atomic mass units (amu), is derived from time-of-flight measurements as is well known in the art. The path lengths from the source region portion 110 to the detectors are known for each of faces 141*a*, 141*b*. The path length to each face 141*a*, 141*b* divided by the measured time-of-flight indicates the average speed of the ions. The energy provided by the source field (in electron volts) divided by the square of the speed is proportional to the mass (or said another way—an ion's time-of-flight is proportional the square root of its mass).

It is noted that the path length to the first face 141*a*, is much shorter than the path length to the second face 141*b*. Therefore a molecule of a given mass, say 6000 amu, arrives at the first face 141*a* much earlier than another molecule of the same mass arrives at the second face 141*b*. By plotting signal against mass, the differences in positions on the horizontal axes are eliminated (, and the two independent measurements can be aligned for comparison and analysis. On the graphs of FIG. 2A and FIG. 2B using mass axes 210*a*, 210*b*, respectively, the linear spectrum 240 can be compared directly with the reflector spectrum 250.

The spectra 240, 250 are similar in some respects and different in some respects. Several peaks are evident in both spectra 240, 250. A peak represents a mass that is present in great numbers compared to most masses resolved by the spectrometer. For example peaks 242*a*, 242*b*, 242*c* and 242*c* are evident in linear spectrum 240. Corresponding peaks, at the same masses, in the reflector spectrum 250 include peaks 252*a*, 252*b*, 252*c*, 252*d*, respectively.

The reflector spectrum 250, with the longer path and flight times, has greater resolution in mass, i.e., distinguishes smaller differences in mass, than does the linear spectrum 240. This is evident by the narrowness of the peak 252*a* in the reflector spectrum 250 compared to the corresponding peak 242*a* in the linear spectrum 240.

The reflector spectrum 250 suffers from fragmentation of larger molecules. This is illustrated by the relatively low signal level associated with peak 252*d* at mass over 8000 amu compared to peak 252*a* at mass less than 2000 amu in the reflector spectrum 250. In the linear spectrum 240, in contrast, the peak 242*d* at mass over 8000 amu has a greater signal level than the peak 242*a* under 2000 amu. Similarly, a small peak near 9800 amu in linear spectrum 240 is completely missing from reflector spectrum 250.

Some masses that appear significant in one spectrum do not appear significant in the other. For example, the peak 242*b* apparent in linear spectrum 240 at about 3000 amu appears in reflector spectrum 250 as a rather insignificant peak 252*b*. It is assumed, for purposes of illustration, that a component of an agent of interest is associated with a peak at 3000 amu. The peak 242*b* might be due to noise, since the peak does not appear significant in the reflector spectrum 250. If the peak 242 is due to noise, a conclusion that the agent is present constitutes a false alarm, which would seriously degrade the usefulness of the system.

On the other hand, peaks that appear in both spectra allow detections to be made with more confidence. It is assumed, for purposes of illustration, that a second agent of interest is associated with multiple peaks at about 1800 amu, 4200 amu and 8500 amu. Peaks at these masses are observed in both spectra—peaks 242*a*, 242*c*, 242*d* in linear spectrum 240 and peaks 252*a*, 252*c*, 252*d* in reflector spectrum 250. It is unlikely all three peaks are generated by noise in both spectra. A conclusion that the second agent is present is justified. Such a conclusion is reached with some confidence based on a single ion beam formed from a single sample ionized in the source region, which simultaneously (e.g., from the same sample prepared once and inserted once into the spectrometer) produced both spectra 240, 250.

The graphs of FIG. 2A and FIG. 2B illustrate that detection of agents of interest in a sample are based, at least in part, on both the linear spectrum 240 and the reflector spectrum 250 determined from the signals output by detectors on both faces 141*a* and 141*b* simultaneously.

Figure 3:
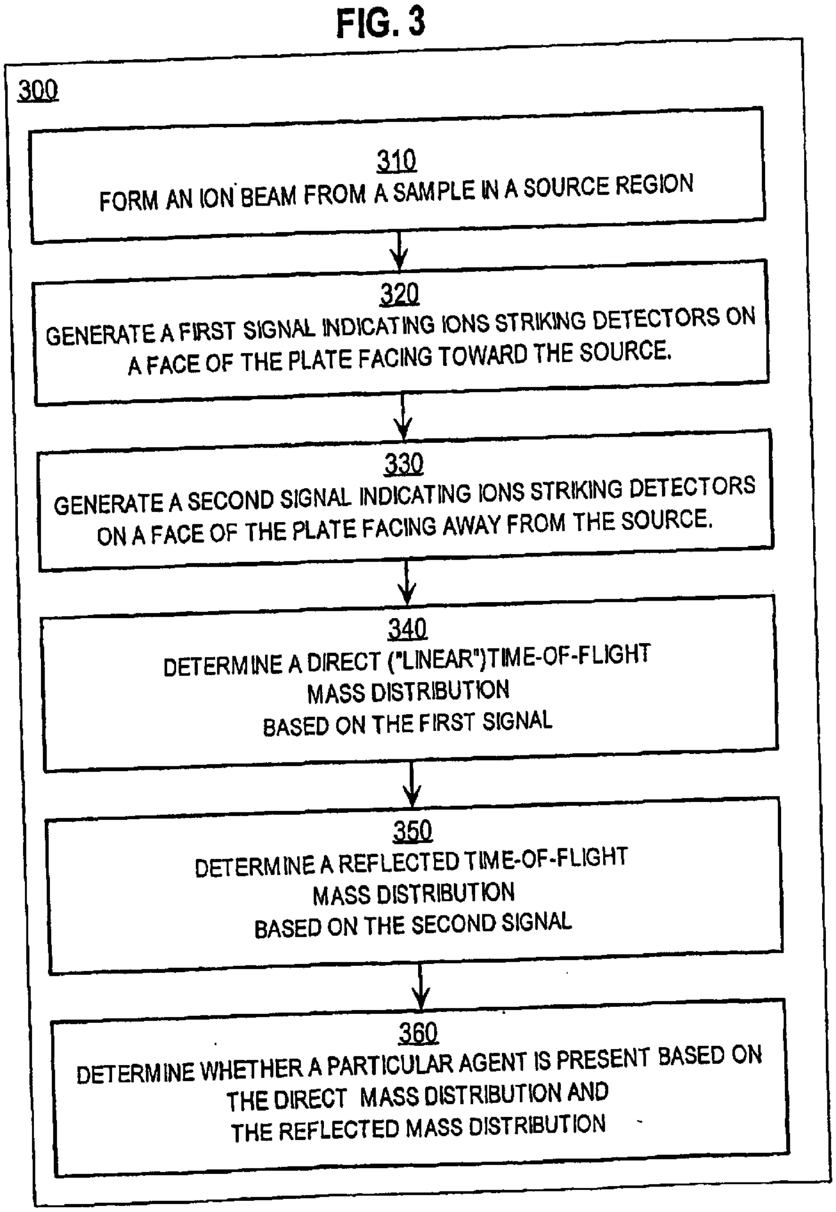
FIG. 3 is a flow chart that illustrates at a high level a method for determining an agent in a mass spectrometer, according to an embodiment.

The spectrum of FIG. 2A represents extra signal strength and independent observations that are lost in conventional reflected time-of-flight mass spectrometers 4. Method of Determining Complex Molecular Agents FIG. 3 is a flow chart that illustrates at a high level a method 300 for determining an agent in a mass spectrometer, according to an embodiment.

In step 310, an ion beam is formed from a sample in a source region of a vacuum chamber. Any method known in the art for forming an ion beam may be employed. In one embodiment, a laser beam is directed on the sample in the source region 110 through a transparent portion of a wall of the reflector region portion 124, and through the center hole 148 in detector 140. The laser beam ionizes molecules in the sample. An electric field is applied in the source region portion 110 to accelerate the molecules to a predetermined energy and to focus the ions into an ion beam 102. Any method known in the art when the mass spectrometer is constructed may be used to accelerate and focus the ion beam. The ion beam is directed into the drift region portion 122 of the flight tube 120.

In step 320, a linear signal is generated. The linear signal is related to the number of ions that impinge on detectors on a face of the plate that faces the source region during each of several time intervals. For example, a signal is generated on linear output terminal 142 based on the amount of ions of the diverging ion beam 102 that strike face 141*a* of the dual-sided channelplate detector 140 every few microseconds for several milliseconds. This signal is based on ions that do not pass through the hole 148 into the reflector region portion 124 of the flight tube 120. Thus this signal represents extra signal strength that is lost in a conventional reflector mass spectrometer.

In step 330, a reflector signal is generated. The reflector signal is related to the number of ions striking detectors on a face of the plate that faces the reflector region during each of several time intervals. For example, a signal is generated on reflector output terminal 144 based on the amount of ions of the reflecting ion beam 104 that strike face 141*b* of the dual-sided channelplate detector 140 every few microseconds for several milliseconds.

In step 340, a linear time-of-flight mass distribution is determined based on the linear signal. For example, a computer receives the linear signal and generates linear spectrum 240 based on the linear signal according to instructions stored on the computer. This spectrum is based on observations of ions that are not measured in a conventional reflector mass spectrometer. Thus this spectrum is a statistically independent observation that is not available from a conventional reflector mass spectrometer In step 350, a reflector time-of-flight mass distribution is determined based on the reflector signal. For example, a computer receives the reflector signal and generates reflector spectrum 250 based on the reflector signal according to instructions stored on the computer.

In step 360, it is determined whether a particular agent is present in the sample based at least in part on the linear mass distribution and the reflected mass distribution. For example, a computer determines whether a particular agent is present in the sample based on the linear spectrum 240 and reflector spectrum 250 according to instructions stored on the computer. In a conventional reflector mass spectrometer, such a determination cannot be made with the same confidence due to measurement noise and fragmentation.

5. Computer Implementation Overview

Figure 4:
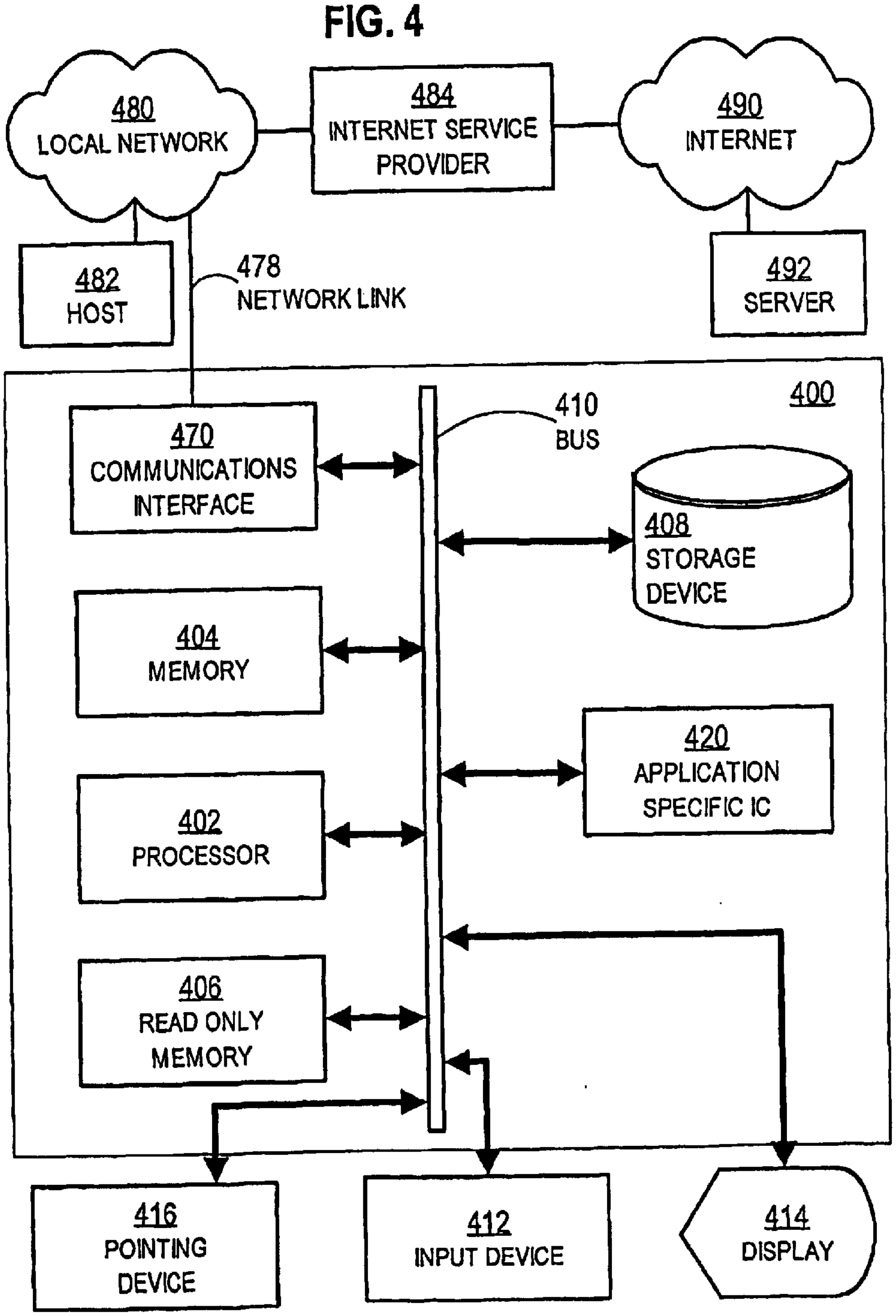
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a communication mechanism such as a bus 410 for passing information between other internal and external components of the computer system 400. Information is represented as physical signals of a measurable phenomenon, typically electric voltages, but including, in other embodiments, such phenomena as magnetic, electromagnetic, pressure, chemical, molecular and atomic interactions. For example, north and south magnetic fields, or a zero and non-zero electric voltage, represent two states (0, 1) of a binary digit (bit). A sequence of binary digits constitutes digital data that is used to represent a number or code for a character. A bus 410 includes many parallel conductors of information so that information is transferred quickly among devices coupled to the bus 410. One or more processors 402 for processing information are coupled with the bus 410. A processor 402 performs a set of operations on information. The set of operations include bringing information in from the bus 410 and placing information on the bus 410. The set of operations also typically include comparing two or more units of information, shifting positions of units of information, and combining two or more units of information, such as by addition or multiplication. A sequence of operations to be executed by the processor 402 constitute computer instructions.

Computer system 400 also includes a memory 404 coupled to bus 410. The memory 404, such as a random access memory (RAM) or other dynamic storage device, stores information including computer instructions. Dynamic memory allows information stored therein to be changed by the computer system 400. RAM allows a unit of information stored at a location called a memory address to be stored and retrieved independently of information at neighboring addresses. The memory 404 is also used by the processor 402 to store temporary values during execution of computer instructions. The computer system 400 also includes a read only memory (ROM) 406 or other static storage device coupled to the bus 410 for storing static information, including instructions, that is not changed by the computer system 400. Also coupled to bus 410 is a non-volatile (persistent) storage device 408, such as a magnetic disk or optical disk, for storing information, including instructions, that persists even when the computer system 400 is turned off or otherwise loses power.

Information, including instructions, is provided to the bus 410 for use by the processor from an external input device 412, such as a keyboard containing alphanumeric keys operated by a human user, or a sensor. A sensor detects conditions in its vicinity and transforms those detections into signals compatible with the signals used to represent information in computer system 400. Other external devices coupled to bus 410, used primarily for interacting with humans, include a display device 414, such as a cathode ray tube (CRT) or a liquid crystal display (LCD), for presenting images, and a pointing device 416, such as a mouse or a trackball or cursor direction keys, for controlling a position of a small cursor image presented on the display 414 and issuing commands associated with graphical elements presented on the display 414.

In the illustrated embodiment, special purpose hardware, such as an application specific integrated circuit (IC) 420, is coupled to bus 410. The special purpose hardware is configured to perform operations not performed by processor 402 quickly enough for special purposes. Examples of application specific ICs include graphics accelerator cards for generating images for display 414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 400 also includes one or more instances of a communications interface 470 coupled to bus 410. Communication interface 470 provides a two-way communication coupling to a variety of external devices that operate with their own processors, such as printers, scanners and external disks. In general the coupling is with a network link 478 that is connected to a local network 480 to which a variety of external devices with their own processors are connected. For example, communication interface 470 may be a parallel port or a serial port or a universal serial bus (USB) port on a personal computer. In some embodiments, communications interface 470 is an integrated services digital network (ISDN) card or a digital subscriber line (DSL) card or a telephone modem that provides an information communication connection to a corresponding type of telephone line. In some embodiments, a communication interface 470 is a cable modem that converts signals on bus 410 into signals for a communication connection over a coaxial cable or into optical signals for a communication connection over a fiber optic cable. As another example, communications interface 470 may be a local area network (LAN) card to provide a data communication connection to a compatible LAN, such as Ethernet. Wireless links may also be implemented. For wireless links, the communications interface 470 sends and receives electrical, acoustic or electromagnetic signals, including infrared and optical signals, that carry information streams, such as digital data. Such signals are examples of carrier waves.

The term computer-readable medium is used herein to refer to any medium that participates in providing instructions to processor 402 for execution. Such a medium may take many forms, including, but not limited to, non-volatile media, volatile media and transmission media. Non-volatile media include, for example, optical or magnetic disks, such as storage device 408. Volatile media include, for example, dynamic memory 404. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape, or any other magnetic medium, a compact disk ROM (CD-ROM), or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Network link 478 typically provides information communication through one or more networks to other devices that use or process the information. For example, network link 478 may provide a connection through local network 480 to a host computer 482 or to equipment 484 operated by an Internet Service Provider (ISP). ISP equipment 484 in turn provides data communication services through the public, world-wide packet-switching communication network of networks now commonly referred to as the Internet 490. A computer called a server 492 connected to the Internet provides a service in response to information received over the Internet. For example, server 492 provides information representing video data for presentation at display 414.

The invention is related to the use of computer system 400 for implementing the techniques described herein. According to one embodiment of the invention, those techniques are performed by computer system 400 in response to processor 402 executing one or more sequences of one or more instructions contained in memory 404. Such instructions, also called software and program code, may be read into memory 404 from another computer-readable medium such as storage device 408. Execution of the sequences of instructions contained in memory 404 causes processor 402 to perform the method steps described herein. In alternative embodiments, hardware, such as application specific integrated circuit 420, may be used in place of or in combination with software to implement the invention. Thus, embodiments of the invention are not limited to any specific combination of hardware and software.

The signals transmitted over network link 478 and other networks through communications interface 470, which carry information to and from computer system 400, are exemplary forms of carrier waves. Computer system 400 can send and receive information, including program code, through the networks 480, 490 among others, through network link 478 and communications interface 470. In an example using the Internet 490, a server 492 transmits program code for a particular application, requested by a message sent from computer 400, through Internet 490, ISP equipment 484, local network 480 and communications interface 470. The received code may be executed by processor 402 as it is received, or may be stored in storage device 408 or other non-volatile storage for later execution, or both. In this manner, computer system 400 may obtain application program code in the form of a carrier wave.

Various forms of computer readable media may be involved in carrying one or more sequence of instructions or data or both to processor 402 for execution. For example, instructions and data may initially be carried on a magnetic disk of a remote computer such as host 482. The remote computer loads the instructions and data into its dynamic memory and sends the instructions and data over a telephone line using a modem. A modem local to the computer system 400 receives the instructions and data on a telephone line and uses an infra-red transmitter to convert the instructions and data to an infra-red signal, a carrier wave serving as the network link 478. An infrared detector serving as communications interface 470 receives the instructions and data carried in the infrared signal and places information representing the instructions and data onto bus 410. Bus 410 carries the information to memory 404 from which processor 402 retrieves and executes the instructions using some of the data sent with the instructions. The instructions and data received in memory 404 may optionally be stored on storage device 408, either before or after execution by the processor 402.

6. Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus for simultaneously detecting direct and reflected ions in a mass spectrometer, comprising:

a flight tube;

a source for generating an ion beam of ions of a sample and introducing the ion beam into a first portion of the flight tube;

a reflector for reflecting ions from the ion beam in a second portion of the flight tube; and a plate substantially perpendicular to an axis of the ion beam, wherein the plate is disposed between the first portion of the flight tube and the second portion of the flight tube, the plate has a hole through which some ions in the ion beam may pass from the first portion to the second portion of the flight tube, and each of two opposite faces of the plate includes a set of one or more ion detectors.

2. The apparatus as recited in claim 1, further comprising:

a first signal terminal for carrying a first signal based on ions in the ion beam detected by a first set of one or more ion detectors during a time interval, the first set on a first face of the two opposite faces, the first face forming a side of the first portion of the flight tube; and a second signal terminal for carrying a second signal based on ions in the ion beam detected by a second set of one or more ion detectors during the time interval, the second set on a second face of the two opposite faces, the second face forming a side of the second portion of the flight tube.

3. The apparatus as recited in claim 1, wherein the set of ion detectors is a plurality of microchannel plate ion detectors.

4. The apparatus as recited in claim 1, wherein a direct line, time-of-flight mass spectrum determination is based on ions detected by a first set of one or more ion detectors on a first face of the two opposite faces, the first face directed towards the first portion of the flight tube.

5. The apparatus as recited in claim 1, wherein a reflected time-of-flight mass spectrum determination is based on ions detected by a second set of one or more ion detectors on a second face of the two opposite faces, the second face directed towards the second portion of the flight tube.

6. The apparatus as recited in claim 1, wherein the plate separates the first portion from the second portion of the flight tube.

7. A method for fabricating an apparatus for simultaneously detecting direct and reflected ions in a mass spectrometer, comprising:

installing, onto a flight tube, a source for generating an ion beam of ions of a sample and introducing the ion beam into a first portion of the flight tube;

installing, in the flight tube, a reflector for reflecting ions from the ion beam in a second portion of the flight tube; and installing, in the flight tube, between the first portion of the flight tube and the second portion of the flight tube, a plate substantially perpendicular to an axis of the ion beam, wherein the plate has a hole through which some ions in the ion beam may pass from the first portion to the second portion of the flight tube, and each of two opposite faces of the plate includes a set of one or more ion detectors.

8. A method for simultaneously detecting direct and reflected ions in a mass spectrometer, comprising:

forming, in a source of ions, a ion beam from a sample;

generating a first signal indicating a number of first ions from the ion beam, the first ions striking a first face of a plate directed toward the source of ions;

generating a second signal indicating a number of second ions from the same ion beam, the second ions striking a second face of the plate, the second face directed away from the source of ions and directed toward the second ions that pass through a hole in the plate and that are reflected in a reflecting electric field;

determining a direct time-of-flight mass distribution based on the first signal; and determining a reflected time-of-flight mass distribution based on the second signal.

9. A method as recited in claim 8, wherein the first signal indicates a number of the first ions in each time interval of multiple time intervals.

10. A method as recited in claim 8, wherein the second signal indicates a number of the second ions in each time interval of multiple time intervals.

11. A method as recited in claim 8, further comprising determining whether a particular agent is present in the sample based, at least in part, on the direct time-of-flight mass distribution and the reflected time-of-flight mass distribution.

12. A method for determining whether a particular agent is present in a sample, comprising:

receiving a first signal indicating a number of first ions from a ion beam generated from the sample in a source, the first ions striking a first face of a plate directed toward a source of ions;

receiving a second signal indicating a number of second ions from the same ion beam, the second ions striking a second face of the plate, the second face directed away from the source of ions and directed toward the second ions that pass through a hole in the plate and that are reflected in a reflecting electric field;

determining a direct time-of-flight mass distribution based on the first signal;

determining a reflected time-of-flight mass distribution based on the second signal; and determining whether the particular agent is present in the sample based, at least in part, on the direct time-of-flight mass distribution and the reflected time-of-flight mass distribution.

13. A computer-readable medium carrying one or more sequences of instructions for determining whether a particular agent is present in a sample, wherein execution of the one or more sequences of instructions by one or more processors causes the one or more processors to perform the steps:

receiving a first signal indicating a number of first ions from a ion beam generated from the sample in a source, the first ions striking a first face of a plate directed toward a source of ions;

receiving a second signal indicating a number of second ions from the same ion beam, the second ions striking a second face of the plate, the second face directed away from the source of ions and directed toward the second ions that pass through a hole in the plate and that are reflected in a reflecting electric field;

determining a direct time-of-flight mass distribution based on the first signal;

determining a reflected time-of-flight mass distribution based on the second signal; and determining whether the particular agent is present in the sample based, at least in part, on the direct time-of-flight mass distribution and the reflected time-of-flight mass distribution.

14. An apparatus for determining whether a particular agent is present in a sample, comprising:

a processor; and a computer readable medium carrying one or more sequences of instructions, wherein execution of the one or more sequences of instructions by the processor causes the processor to perform the steps of:

receiving a first signal indicating a number of first ions from a ion beam generated from the sample in a source, the first ions striking a first face of a plate directed toward a source of ions;

receiving a second signal indicating a number of second ions from the same ion beam, the second ions striking a second face of the plate, the second face directed away from the source of ions and directed toward the second ions that pass through a hole in the plate and that are reflected in a reflecting electric field;

determining a direct time-of-flight mass distribution based on the first signal;

determining a reflected time-of-flight mass distribution based on the second signal; and determining whether the particular agent is present in the sample based, at least in part, on the direct time-of-flight mass distribution and the reflected time-of-flight mass distribution.

* * * * *